(12) United States Patent
Obillo

(10) Patent No.: US 11,326,978 B2
(45) Date of Patent: May 10, 2022

(54) LEAK INDICATING CLAMP

(71) Applicant: Keith Obillo, Concord, MA (US)

(72) Inventor: Keith Obillo, Concord, MA (US)

( * ) Notice: Subject to any disclaimer, the term of this patent is extended or adjusted under 35 U.S.C. 154(b) by 128 days.

(21) Appl. No.: 16/877,263

(22) Filed: May 18, 2020

(65) Prior Publication Data

US 2020/0363284 A1 Nov. 19, 2020

Related U.S. Application Data

(60) Provisional application No. 62/849,785, filed on May 17, 2019.

(51) Int. Cl.
*G01M 3/36* (2006.01)
*G01M 3/04* (2006.01)

(52) U.S. Cl.
CPC .............. *G01M 3/36* (2013.01); *G01M 3/04* (2013.01)

(58) Field of Classification Search
CPC ........ G01M 3/36; G01M 3/04; F16L 2201/30; F16L 2201/60; F16L 23/006
See application file for complete search history.

(56) References Cited

U.S. PATENT DOCUMENTS

| | | | |
|---|---|---|---|
| 6,367,843 B1 * | 4/2002 | Fetzer | B01J 3/03 285/24 |
| 7,716,967 B2 * | 5/2010 | Woods | G01M 3/223 73/46 |
| 2005/0046180 A1 * | 3/2005 | Tombler, Jr. | F16J 15/164 285/95 |
| 2018/0017463 A1 * | 1/2018 | Stonitsch | G01M 3/2861 |

* cited by examiner

*Primary Examiner* — David Z Huang
(74) *Attorney, Agent, or Firm* — Prudens Law LLC; Shawn Diedtrich

(57) ABSTRACT

A leak indicating clamp utilizes a bracket clamp, a flag body, and a flag cap that enables quick identification of leaks within various pipe-based systems.

10 Claims, 3 Drawing Sheets

LEAK INDICATING CLAMP

PRIORITY CLAIM

The present invention claims priority to and the benefit of U.S. Provisional Application No. 62/849,785, the contents of which are incorporated herein by reference.

TECHNICAL FIELD

The present invention is generally related to identifying leaks in systems. More particularly, the present invention enables identifying the location of leaks of liquid and/or gas within a pipe-based or enclosed system.

BACKGROUND

Leaks of gas and liquids occur in a variety of systems such as gas turbine such as gas turbine systems (including fuel gas supply and interconnects, false start drains and compressors), pumping systems, refrigeration systems, gas distribution systems and the like. Typically, once a leak occurs, the leak must be identified by entering hazardous areas to identify the location of the leak. In best practice, workers must wait for a particular system to be shut down and isolated, wait for the affected area to be safe, and then enter the hazardous environment to search for the offending leak. The process can quickly multiply into wasted hours per event and lost availability of the shut down system (e.g., gas turbines remain non-operational).

In searching for the leak, workers may have to visually inspect multiple flanges (e.g, gas turbines can have hundreds of potential flange leak locations within a turbine compartment) before repair work is conducted. Additional equipment may have to be utilized depending on the environment to detect the leaks. The leak locating process can easily cost multiples in time and money of the actual repair process of a leak.

Previous leak detection systems may detect leaks but cannot alleviate the leak with the same apparatus or without shutdown. Other detectors cannot be used in liquid and gas applications. Some leak indicators will indicate a leak, relieve the leak using the indicator, but the indicator may return to a "non-indication state" if the leak is below a certain threshold, which requires either electronic means of communicating leak detection making it difficult to retrofit existing piping system. Other issues include flange connection that are uneven or deteriorated, which creates an offset in the flange faces that prevent proper sealing of the monitor environment. Retrofitting or repairing such connections require expensive shutdown processes and replacement.

What is needed is a system to shorten the time to identify leaks, increase the safety of the leak identification process, identify small leaks before they become major leaks, which cost time or efficiency, and that has the ability to be fitted to existing pipe applications.

SUMMARY

While the way in which the present invention addresses the disadvantages of the prior art will be discussed in greater detail below, in general, the present invention provides for identifying leaks in various systems. In particular, the present invention includes a boundary cover that is secured with a bracket clamp having one or more bolt pivot pins that maintains pressure on the piping connection. Once the boundary is sealed, a leak collection area is created by a flag body and a flag cap. Once a leak occurs, the increased pressure or flow from the leak in the collection area exerts pressure on the flag cap until it forced from the flag body.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description or may be learned by the practice of the invention.

BRIEF DESCRIPTION OF THE DRAWINGS

In order to describe the manner in which the advantages and features of the present invention can be obtained, a more particular description of the present invention will be rendered by reference to specific embodiments and examples, which are illustrated in the appended drawings. Understanding that these drawings depict only typical embodiments of the invention and are not therefore to be considered to be limiting of its scope, the present invention will be described and explained with additional specificity and detail through the use of the accompanying drawings in which.

DETAILED DESCRIPTION

Figure 1:
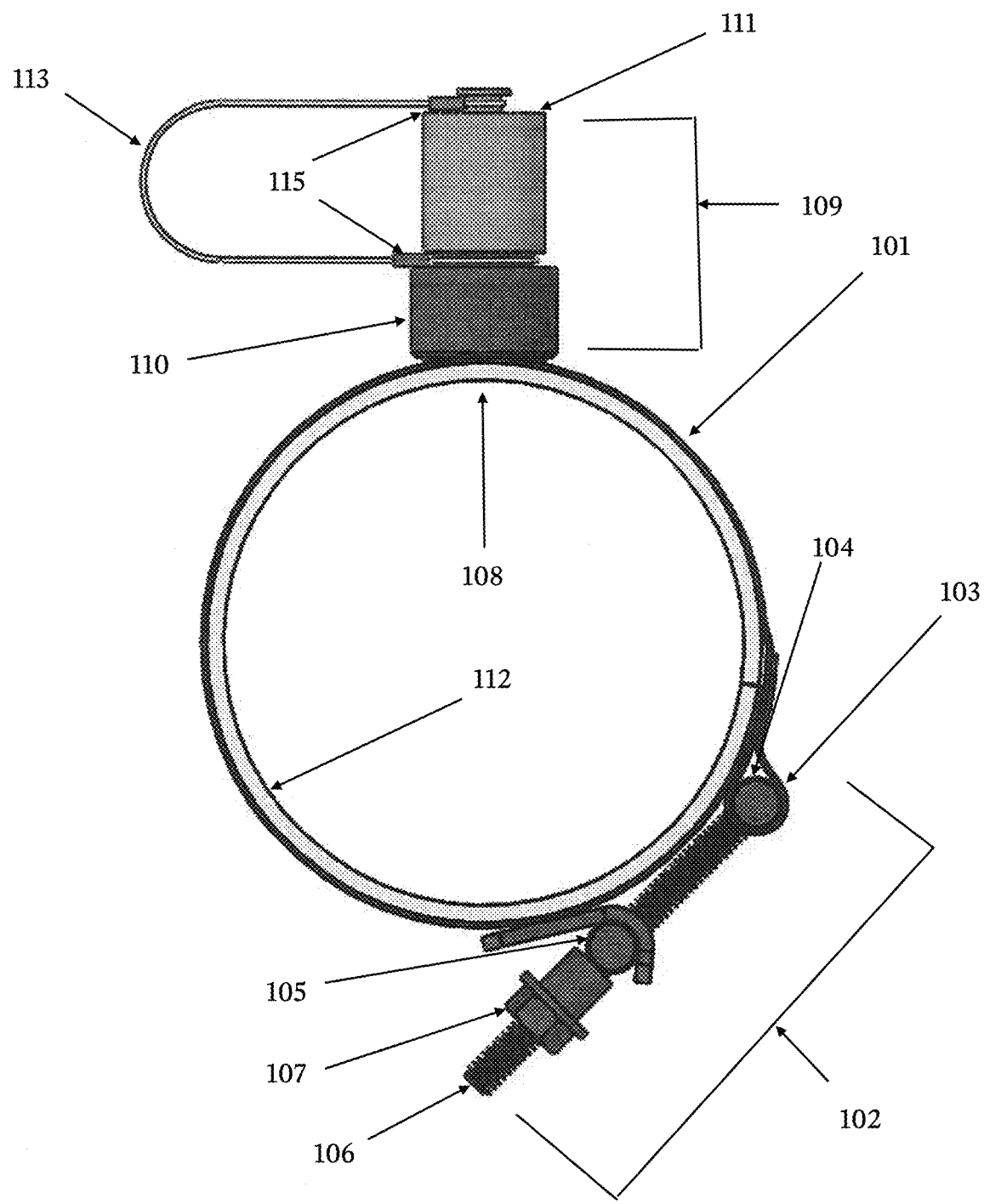
FIG. 1 illustrates a front view of an exemplary leak indicating clamp.

Various embodiments of the invention are described in detail below. A person skilled in the relevant art will recognize that other components and configurations may be easily used or substituted than those that are described here without parting from the spirit and scope of the invention. As will be appreciated by one of ordinary skill in the art, the system may be embodied as a customization of an existing system, an add-on product, and/or a stand-alone system.

As will become apparent from the following descriptions, the present invention enables identifying a leak in various pipe-based systems. A leak indicating clamp includes a boundary cover, a bracket clamp having one or more bolt pivot pins, a flag body, and a flag cap. The system may be applied to various apparatus, applications and industries such as gas turbines, gas pipelines, pumping stations, pipe systems, and pipe systems containing flanges. Applicable industries include power generation, oil and gas production, shipping, water and sewage, mining, tunneling, commercial and residential gas and propane and the like. The system includes detecting leaks in gas, liquid, or other environments. The system also can operate in high and low temperature environments.

The leak indicating clamp includes any hardware and/or software suitably configured to identify the location of a leak within a boundary defined by the connection of two ends of a pipe. In general, the clamp is implemented to encompass a potential fail point, e.g., a flange in piping, and provide an indication of a leak should pressure, whether liquid, gas, or both, within the bounded connection reach a critical level. The clamp may be constructed or fabricated from a variety of materials suitable for a particular application of the leak indication apparatus. Criteria for material selection may include ambient system conditions, chemical conditions, temperature requirements, pressure requirements, flow requirements, or replacement cycle time.

The boundary cover is suitably configured to encompass a potential fail point and create a sealed boundary so that any material that leaks from the fail point is captured within the contained area. In an exemplary embodiment, the potential fail point is a flange connection within a pipe-based system. However, in other embodiments, the potential fail point may be a suspected weak point within a vessel. In some embodiments, the potential fail point is a tubing connection and/or the various well-known connectors present in tubing systems. In pipe-based systems, when the two ends of a pipe are connected a flange is used at each end and then secured together using various types of connections. There are a variety of well-known flanges depending on the particular application and they will not be explained in detail here. However, many of the flange connections create a small space between the flanges, which will be referred to as a "flange area."

An exemplary boundary cover embodiment is a flange cover that has an inner side in communication with each flange so that the flange area is enclosed. The flange cover may take the shape in various forms. The flange cover may also be connected to different points at each flange. For example, one side of the inner edge of the flange cover may wrap around the rim or lip of one flange and the other side of the inner edge of the flange cover may envelop the second flange and be connected to the backside of the second flange or the pipe itself. In an exemplary embodiment, the inner edge of the flange cover is secured to the outer rims of the flanges.

In some embodiments, a sealing aid may be employed. Sometimes flange covers do not exactly line up with each other so that a seal can be made with a rigid flange cover. In other cases, flanges may deteriorate at different rates from their opposing flange. In yet other situations, the application may cause the pipes and therefore the flanges to vibrate. In these situations, the flange area may increase or decrease. A sealing aid may be applied around the rims of the flanges to help ensure the area between the flanges remains enclosed. The flange cover is then secured around the flanges on top of the sealing aid. In some embodiments, the sealing aid is joint sealant. An exemplary joint sealant is Polytetrafluoroethylene (PTFE). However, any sealing aid suitable for the final application is within the spirit and scope of the invention.

Once a specific boundary is defined, e.g., by sealing the boundary area, any leakage from the flanges will leak into a sealed boundary area. For example, when a pipe flange fails, liquid (or gas) will begin to leak into the sealed flange area. As a result, pressure increases inside the sealed flange area.

The boundary cover may be constructed in as many pieces as necessary to encompass a specific boundary. In one exemplary embodiment, the system is constructed in two pieces. In multiple piece constructions, the pieces may be connected in a variety of ways as long on the attachments are able to secure a sealed environment. In some embodiments, the connections are hinged. In other embodiments, the pieces are connected by compression type fittings. In another embodiment, the system is constructed as one piece. In many embodiments, the piece or pieces are injection molded.

The boundary cover is secured around a boundary, for example, a flange connection by a bracket clamp. In some embodiments, more than one bracket clamp may be employed depending on the final application. The bracket clamp enables the boundary cover to be secured evenly by maintaining pressure on the flange connection so that the sealed environment is maintained during installation and/or operation. Without proper tension and seal, the leak indicating clamp may become inoperable. Ideally, the bracket clamp applies pressure substantially transversely to the boundary cover; however, pressure may be applied at one or more angles to the boundary cover depending on the desired application. In some embodiments, the bracket clamp has one or more bolt pivot pins, a threaded rod, a nut bracket, and a threading nut.

FIG. 1 illustrates an exemplary embodiment of a boundary cover for a flange connection having a bracket clamp. The bracket clamp 102 is secured to a flange cover 101 with a nut bracket 103 installed so that a first bolt pivot pin 104 may be inserted into a top portion of the nut bracket and be substantially perpendicular to the flange cover. A threaded hole in the middle of the first bolt pivot pin 104 receives a threaded rod 106. A second bolt pivot pin 105 is inserted into a bottom portion of the nut bracket 103 substantially perpendicular to the flange cover. A threaded hole in the middle of the second bolt pivot pin 105 receives the threaded rod 106. A hex nut 107 is threaded onto the threaded rod 106 and tightened so that the bracket clamp applies the desired pressure to the flange cover and forms a sealed environment. The use of the bolt pivot pins in the bracket clamp enables a wide variety of applications because the pivot pins enable the bracket clamp to apply even tension and pressure across the flange cover.

In some embodiments utilizing a flange cover, the type of seal configuration depends on the flange cover material. In some embodiments, a flange cover may be sealed with a press and seal configuration. In other embodiments utilizing a flange cover, the flange cover may be sealed using a gasket configuration. For embodiments using injection molded high temperature materials, a preferred configuration is the press and seal configuration, which is thermally formed into the upper and lower flange covers. For embodiments in higher pressure or temperature applications, a preferred configuration is a gasket configuration, wherein the flange cover is formed from thin gauge metal sheet material and fitted with gaskets. However, any material and configuration that properly seals the boundary containment system for a particular application is within the spirit and scope of the present invention.

Figure 2:
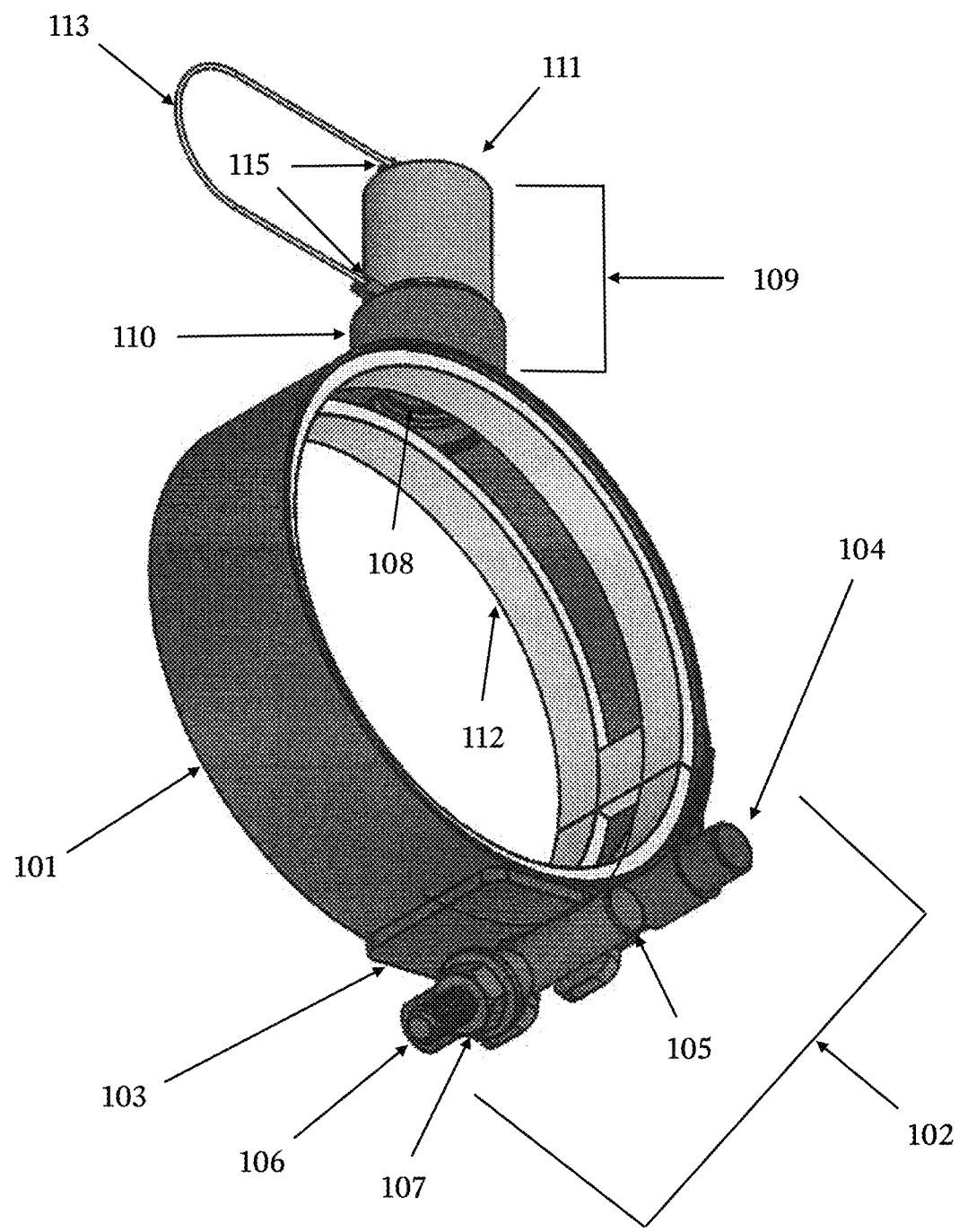
FIG. 2 illustrates a bottom view of an exemplary leak indicating clamp.

The leak indicating clamp includes any hardware and/or software suitably configured to indicate pressure changes within a sealed boundary. The leak indicating clamp indicates a leak when the pressure within the sealed boundary reaches a specified level. In its embodiments, leaking process within the sealed boundary is directed through an aperture (for example, as shown in FIGS. 1 and 2, reference 108) in the boundary cover. The leaking process is captured within a collection area in connection with the aperture in the boundary cover. The collection area is in connection with a sealing element upon which pressure is exerted by the leaking process. In its embodiments, the leaking process exerts pressure on a leak indicator, which in turn forces the leak indicator to activate thereby providing notification of a leak within the specific sealed compartment of the sealed boundary. In some embodiments, the leak indicator is separate from the element that seals the collection area. In other embodiments, the leak indicator is integrated into the element that seals the collection area. For example, the leak indicator may be a pin or brass plug within the sealing element that moves independently from the sealing element when pressure is exerted on the pin or brass plug. In yet other embodiments, the sealing element and the indicator are the same element. In an exemplary embodiment, as illustrated in FIG. 1, the leak indicator is composed of a flag body 110 and a flag cap 111.

The flag body 110 is secured to the boundary cover and provides a portion of the collection area 109. The flag cap 111 is placed on top of the flag body 110, which seals the collection area 109. As pressure increases within the collection area 109, pressure increases on the top portion of the flag cap 111. When enough pressure is applied to the inner top surface of the flag cap 111, it will be forced off the flag body 110 relieving the pressure and thereby indicating a leak. In its embodiments, the flag body and flag cap may be constructed of various pieces connected in a variety of ways as long on the attachments are able to secure a sealed environment before operation.

In some embodiments, multiple flag bodies and flag caps are used to indicate different types of leakage. In some of these embodiments, each indicator may operate independently or depend on the status of the other. Each indicator, however, is constructed specifically for the type of failure it is tasked to indicate and integrated into the overall system in a similar manner as single indicator systems. In yet other embodiments, one flag body and cap may be tasked to indicate multiple types of leaks.

In some embodiments, the leak indicating clamp includes a remote monitoring and notification system. Remote monitoring and notification may be accomplished by using pressure switches, pressure transmitters, flow transducers, settable flow switches and the like. These subsystems enable instantaneous notification of a leak to a remote location. In some remote monitoring embodiments, the leak notification may be an electronic notification at a system monitoring station. Such remote monitoring and notification subsystems are well known and will not be described in detail.

While specific implementations involving a leak indicating clamp are described below, it should be understood that their description is merely illustrative and not intended to limit the scope of the various aspects of the invention.

FIG. 2 illustrates a bottom view of an exemplary leak indicating clamp and demonstrating the aperture 108 through the flange cover 101 that leads to the collection area 109 formed by the flag body 110 and the flag cap 111. In this embodiment, application of the joint sealant 112 ensures that the aperture 108 is not covered while still providing an appropriate seal with a pipe.

Figure 3:
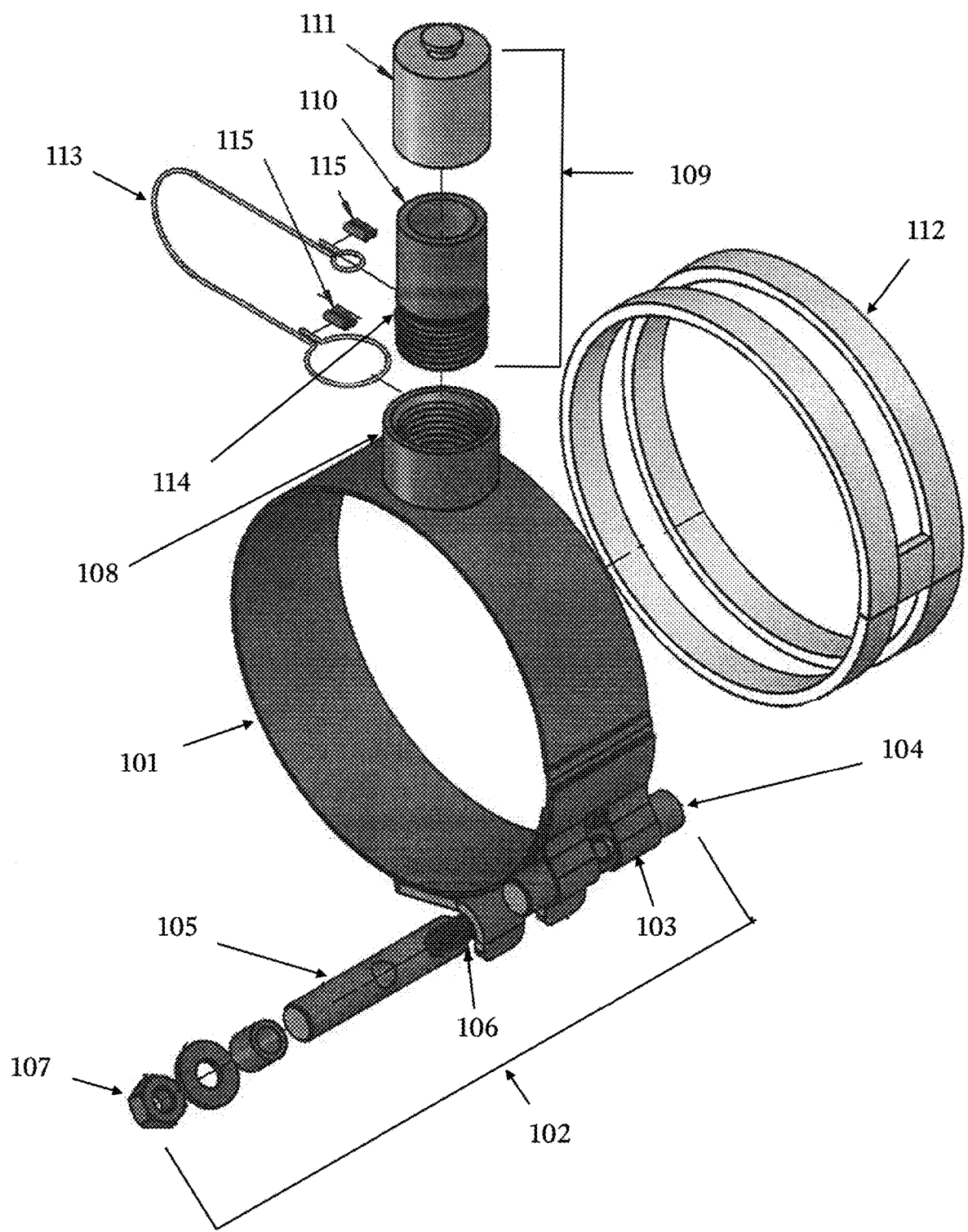
FIG. 3 illustrates an exploded view of an exemplary leak indicating clamp.

FIG. 3 illustrates an exploded view of an exemplary leak indicating clamp. Once a specific boundary is defined, leakage is directed into a collection area 109 defined by the flag body 110 that is sealed with a flag cap 111. The flag cap 111 is placed on top of the flag body 110 as indicated and is secured by a non-sparking wire 113 to the flag body 110 and the flag cap 111. As pressure increases within the collection area 109, pressure increases on the top portion of the flag cap 111. In some embodiments, the flag body 110 has an O-ring 114 placed on its outside surface, which creates a friction surface for the inside of the flag cap 111. In other embodiments, a "ridge" is machined into the flag body to provide a friction surface. A complementary groove may be cut into the inner surface of the flag cap 111 so that when the cap in placed on the flag body 110, the O-ring 114 (or the ridge) and groove engage to secure the flag cap 111. In its embodiments, the flag body 110 and flag cap 111 may be constructed of various pieces connected in a variety of ways as long on the attachments are able to secure a sealed environment before operation.

When enough pressure is applied to the inner top surface of the flag cap 111 to overcome the friction of the O-ring 114, (or groove or similar structure), the flag cap 111 will "pop" off the flag body 110 allowing pressure to escape the collection area 109 and acting as an indication of a leak. The amount of pressure needed may be a function of the size of a butt-weld and/or aperture in the boundary (e.g., flange cover), the material used, the friction proved by the flag cap and flag body, and the characteristics of the material flowing in the pipe (e.g. liquid, gas, etc.). Through manipulation of these variables, the proper friction can be provided between the flag cap and flag body to regulate how much pressure is needed to activate or otherwise dislodge the flag cap 111. For example, a one-inch clamp of the present invention was installed around the flange area of a pipe configuration utilizing a bolted pair of 300 pound, 1-inch flanges. The configuration was attached to a pressure switch set at two psi and a SCFM meter (0.5-6.5 scfm). Upon introducing compressed air into the piping connection, the flag cap was activated at six psi and between 2 and 3 standard cubic feet per minute.

In FIG. 3, the non-sparking wire 113 is secured to the flag body 110 and the flag cap 111 with wire compression sleeves 115 so that the flag cap 111 is easily retrievable and reusable after indicating a leak.

Although the above description may contain specific details, they should not be construed as limiting the claims in any way. Other configurations and equivalents of the described embodiments of the invention are part of the scope of this invention. The descriptions and embodiments are not intended to be an exhaustive or to limit the invention to the precise forms disclosed.

I claim:

1. A leak identification apparatus comprising:
a boundary cover configured to seal an area between two pipe connections, the boundary cover having an aperture through the boundary cover, the aperture configured to receive an indicator body,
a leak indicator configured to cover the indicator body, wherein the connection of the indicator body to the leak indicator creates a sealed boundary to capture a leak within the area such that when the pressure against the leak indicator is greater than a pre-determined pressure, the leak indicator is forced off the indicator body; and
a bracket clamp affixed to the outside of the boundary cover, the bracket clamp having one or more bolt pivot pins secured within the bracket clamp operatively connected to exert a force on the boundary cover using a tightening mechanism.

2. The leak identification apparatus of claim 1 further comprising a joint sealant applied to the inner surface of the boundary cover before application to the two pipe connections.

3. The leak identification apparatus of claim 1 further comprising a remote monitoring system operatively connected to the leak indicating apparatus that sends a notification when the leak indicator is forced off the indicator body.

4. A leak indicating apparatus comprising:
a flange cover encompassing a flange assembly of a piping system creating a flange area, the flange cover having an aperture configured to receive one end of a hollow cylinder;
a closed-end cylinder closed at a first end configured to be coupled to the outside of a second end of the hollow cylinder creating a collection area in communication with the flange area;

a bracket clamp affixed to the outside of the flange cover, the bracket clamp having one or more bolt pivot pins secured within the bracket clamp operatively connected to exert a force on the flange cover using a tightening nut, wherein the closed-end cylinder is forced off the second end of the hollow cylinder when the pressure inside the collection area is more than a pre-determined pressure.

5. The leak indicating apparatus of claim 4 further comprising a joint sealant applied to the inner surface of the flange cover before application over the flange area.

6. The leak indicating apparatus of claim 4 further comprising a remote monitoring system operatively connected to the leak indicating apparatus that sends a notification when the closed-end cylinder is forced off the hollow cylinder.

7. A leak indicating clamp comprising:

a flange area created by a flange assembly in a piping system;

a flange cover attached to the flange assembly so that the flange area is covered;

an aperture in the flange cover that enables leaking process to flow from the flange area to a flag body attached to the flange cover at the aperture;

a flag cap operatively connected over the flag body creating an area of constant pressure;

a ridge situated around the outside of the flag body which maintains a seal between the outside of the flag body and the inside of the flag cap until the pressure of the area overcomes the tension of the ridge's seal with the flag cap;

a bracket clamp affixed to the outside of the flange cover have one or more bolt pivot pins secured within the bracket clamp operatively connected to exert a force on the flange cover using a nut.

8. The leak indicating clamp of claim 7 further comprising a joint sealant applied to the inner surface of the flange cover before application to the flange assembly.

9. The leak indicating clamp of claim 7 wherein the ridge is an O-ring.

10. The leak indicating clamp of claim 7 wherein the ridge is machined into the flag body.

* * * * *